United States Patent
Grady

(10) Patent No.: US 7,585,924 B2
(45) Date of Patent: Sep. 8, 2009

(54) PRESSURIZED HIGH TEMPERATURE POLYMERIZATION PROCESS AND POLYMERIZATION SYSTEM USED THEREIN

(75) Inventor: Michael Charles Grady, Oaklyn, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1195 days.

(21) Appl. No.: 10/617,270

(22) Filed: Jul. 10, 2003

(65) Prior Publication Data

US 2004/0022693 A1    Feb. 5, 2004

Related U.S. Application Data

(60) Provisional application No. 60/395,116, filed on Jul. 11, 2002.

(51) Int. Cl.
*C09D 133/00* (2006.01)
(52) U.S. Cl. .................. 526/65; 526/341; 526/346; 525/310; 524/457; 524/458
(58) Field of Classification Search ............. 525/310; 526/65, 341, 346; 524/457, 458
See application file for complete search history.

(56) References Cited

U.S. PATENT DOCUMENTS

| | | | |
|---|---|---|---|
| 4,414,370 A | | 11/1983 | Hamielee et al. |
| 5,171,768 A | * | 12/1992 | Prentice et al. ............. 523/348 |
| 5,362,826 A | | 11/1994 | Berge et al. |
| 6,046,278 A | | 4/2000 | Freeman et al. |
| 6,346,590 B1 | | 2/2002 | Campbell et al. |
| 6,355,718 B1 | | 3/2002 | Berge et al. |
| 6,355,727 B1 | | 3/2002 | Andrist et al. |
| 6,388,026 B1 | | 5/2002 | Campbell et al. |
| 6,552,144 B1 | | 4/2003 | Campbell et al. |
| 6,605,681 B1 | | 8/2003 | Villalobos et al. |

* cited by examiner

*Primary Examiner*—Irina S Zemel
(74) *Attorney, Agent, or Firm*—Sudhir G. Deshmukh; John Lamming

(57) ABSTRACT

The present invention is directed to a novel high temperature polymerization process operating at high pressures for producing a polymer. The process includes conveying hybrid reactor mixtures, which include one or more hybrid reactor monomers and one or more hybrid reactor initiators to one or more hybrid reactors. The hybrid reactors are maintained at effective hybrid polymerization temperatures and sub-reflux polymerization gage pressures to cause polymerization of a portion of the hybrid reactor monomers into the polymer. The process further includes conveying hybrid reactor contents from the hybrid reactors to one or more batch reactors maintained at effective batch polymerization temperatures and reflux polymerization pressures to cause polymerization of a remaining portion of the hybrid reactor monomers into the polymer. The hybrid reactors are smaller in volume than the batch reactors. By utilizing the hybrid/batch reactor combination, the process of the present invention can be operated under safe working conditions. The process of the present invention also allows control of the polydispersity and molecular weight of the resulting polymers. As a result, the polymers made therefrom can be used as binders in compositions, such as coating compositions used in the automotive refinish and OEM applications having desired coating properties. The present invention is also directed to a polymerization system used in the process of the present invention.

44 Claims, 3 Drawing Sheets

US 7,585,924 B2

PRESSURIZED HIGH TEMPERATURE POLYMERIZATION PROCESS AND POLYMERIZATION SYSTEM USED THEREIN

CROSS REFERENCE TO RELATED APPLICATIONS

This application claims priority under 35 U.S.C. §119 from U.S. Provisional Application Serial No. 60/395,116 (filed Jul. 11, 2002) and under U.S. Non-Provisional Application having Attorney Docket No. FA1195 (filed Jul. 2, 2003) both of which are incorporated by reference herein as if fully set forth.

FIELD OF INVENTION

The present invention generally relates to high temperature polymerization and more particularly relates to high-pressure polymerization utilizing process equipment that produces polymers under safe working conditions.

BACKGROUND OF INVENTION

The art has long sought an inexpensive, efficient and environmentally sound way to produce polymers, particularly low molecular weight oligomers. Such oligomers have been found very useful in producing low VOC (volatile organic component) coating compositions typically used in automotive OEM (original equipment manufacturer) and refinish applications. One method of achieving low molecular weight polymers is through the use of efficient chain transfer agents, but this approach has several drawbacks. This approach incorporates the structure of the chain transfer agent into the polymer chain. This can be undesirable since that structure will have an increasing effect on the properties of the polymer as molecular weight decreases. Furthermore, the chain transfer agents commonly employed are mercaptans. These materials are expensive and have objectionable odors associated with their presence. Other common chain transfer agents are hypophosphites, bisulfites and alcohols. These also add to the cost of the process, impart functionality to the polymer, can introduce salts into the product, and may necessitate a product separation step. Another way of lowering the molecular weight of the polymers produced is by increasing the amount of initiator. This approach adds considerably to the cost of production and may result in polymer chain degradation, crosslinking, and high levels of unreacted initiator remaining in the product. In addition, high levels of initiator may also result in high levels of salt by-products in the polymer mixture, which is known to be detrimental to performance in many applications. The same is true for chain stopping agents such as sodium metabisulfite. Among the preferred free-radical initiators for aqueous polymerization is hydrogen peroxide. It is relatively inexpensive, has low toxicity, and does not produce detrimental salt by-products. However, hydrogen peroxide does not generally decompose efficiently at conventional polymerization temperatures and large amounts must normally be used to generate enough radicals to carry out a polymerization.

An attempt was made in the U.S. Pat. No. 6,046,278 to address the aforedescribed concerns by utilizing a inductively heating tubular reactor at ultra high pressures ranging from 1,000 to 5,000 pounds per square inch (psi) and temperatures ranging from 250° C. to 500° C. to polymerize a reaction mixture in 0.1 seconds to 5 minutes. However, a need still exists for a pressurized process that can safely handle exothermic polymerization of acrylic monomers.

STATEMENT OF INVENTION

The present invention is directed to a process for producing a polymer comprising:
conveying hybrid reactor mixtures comprising one or more hybrid reactor monomers and one or more hybrid reactor initiators to one or more hybrid reactors maintained at effective hybrid polymerization temperatures and sub-reflux polymerization gage pressures to cause polymerization of a portion of said hybrid reactor monomers. into said polymer; and conveying hybrid reactor contents to one or more batch reactors maintained at effective batch polymerization temperatures and reflux polymerization pressures to cause polymerization of a remaining portion of said hybrid reactor monomers into said polymer.

The present invention is also directed to a process for producing a graft copolymer comprising:
conveying hybrid reactor mixtures comprising one or more hybrid reactor monomers and one or more hybrid reactor initiators to one or more hybrid reactors maintained at effective hybrid polymerization temperatures and sub-reflux polymerization gage pressures to cause polymerization of said hybrid monomers into macromonomers;
conveying hybrid reactor contents to one or more batch reactors maintained at effective batch polymerization temperatures and reflux polymerization pressures; and
conveying batch reactor mixtures comprising one or more batch reactor monomers and one or more batch reactor initiators to cause polymerization of said batch reactor monomers into a backbone of said graft copolymer having said macromonomers grafted onto said backbones.

The present invention is further directed to a polymerization system comprising:
means for conveying hybrid reactor mixtures comprising one or more hybrid reactor monomers and one or more hybrid reactor initiators to one or more hybrid reactors;
means for maintaining said hybrid reactors at effective hybrid polymerization temperatures and means for maintaining said hybrid reactors at sub-reflux polymerization gage pressures to cause polymerization of a portion of said hybrid reactor monomers into a polymer;
means for conveying hybrid reactor contents from said hybrid reactors to one or more batch reactors;
means for conveying batch reactor mixtures comprising one or more batch initiators to one or more batch reactors; and
means for maintaining said batch reactors at effective batch polymerization temperatures and means for maintaining said batch reactors at reflux polymerization pressures to cause polymerization of remaining portion of said hybrid reactor monomers into said polymer.

DETAILED DESCRIPTION OF PREFERRED EMBODIMENT

Figure 1:
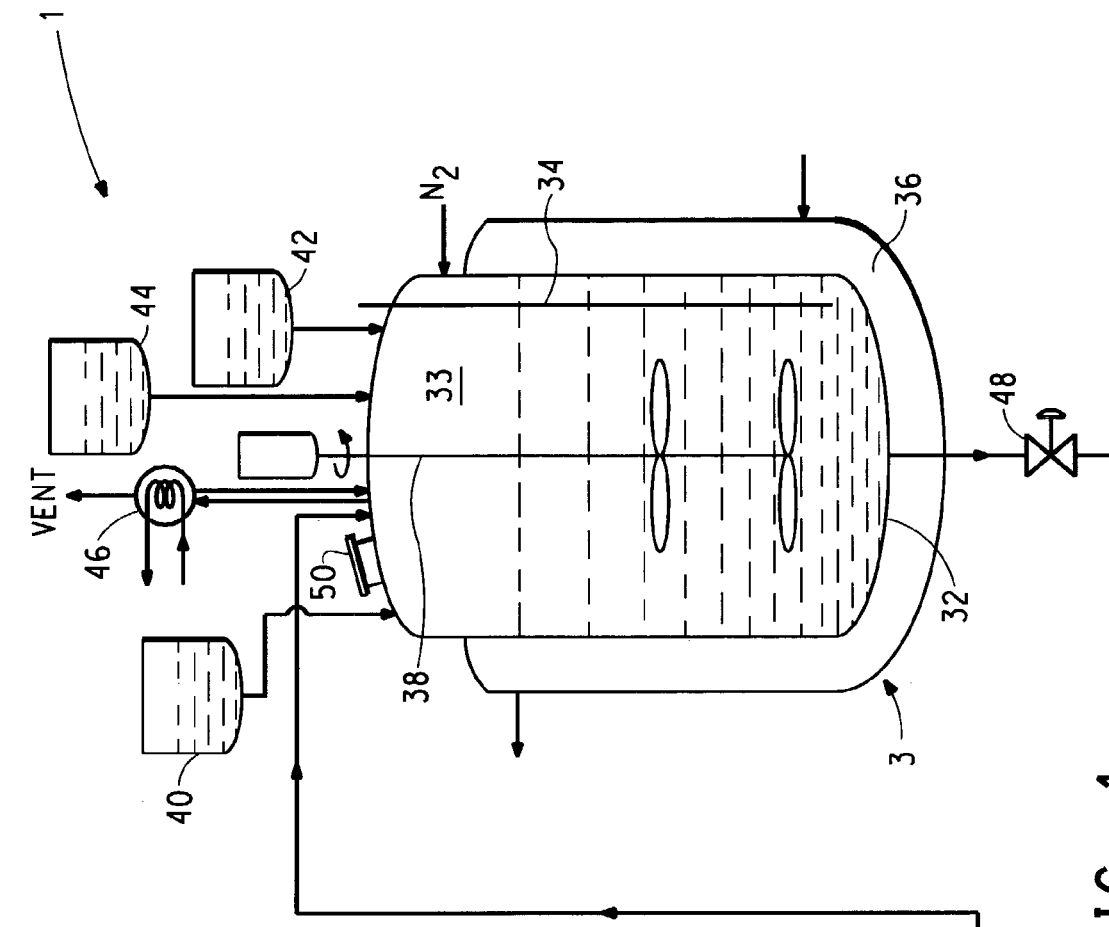
FIG. 1 is a schematic representation of a preferred embodiment of a polymerization system of the present invention.
Figure 1:
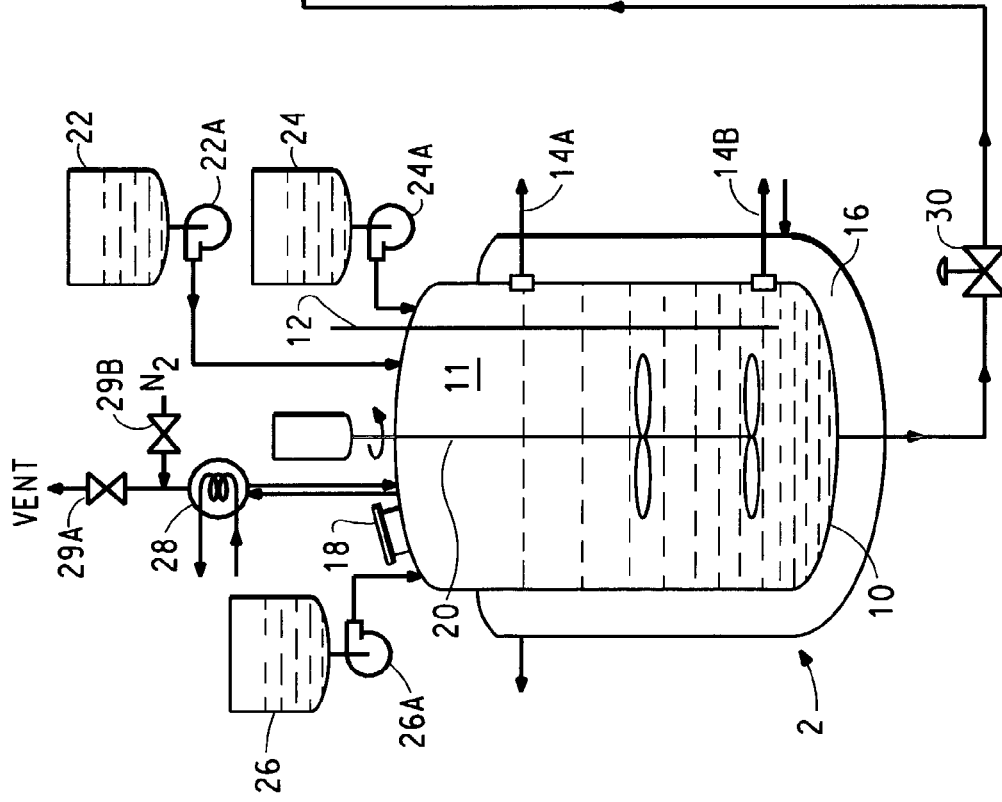

As defined herein:

"Polymer" means homopolymer, copolymer, block copolymer, graft copolymer, comb copolymer, branched copolymer, branch-upon-branch copolymer, non-aqueous polymer dispersion, microgel, star polymer, oligomer, and ladder copolymer. The term oligomer refers to polymers having a degree of polymerization of 100 or less than 100, typically ranging from about 10 to 70.

"(Meth)acrylate" means acrylate and methacrylate.

"GPC weight average molecular weight" means a weight average molecular weight measured by utilizing gel permeation chromatography. A high performance liquid chromatograph (HPLC) supplied by Hewlett-Packard, Palo Alto, Calif. was used. Unless stated otherwise, the liquid phase used was tetrahydrofuran and the standard was polymethyl methacrylate or polystyrene.

"Tg" (glass transition temperature) measured in ° C. determined by DSC (Differential Scanning Calorimetry).

"Macromonomer" means repeat units (mers) of limited chain length or molecular weight, which have such terminal olefinic moieties. By "terminal olefinic moieties" is meant a vinyl molecule comprising (i) carboxylic acid or amide, or (ii) an ester or unsubstituted aryl as well as a moiety selected from epoxy, hydroxy, isocyanato, amino, anhydride, amide, carboxylic acid, silyl, cyano, and halo. The present macromonomers have about 10 to about 800 repeat units linked to the end group. In some cases, for reasons of commercial applicability and/or ease of synthesis, macromonomers having at least 10 and up to about 300 repeat units are preferred. The GPC number average molecular weight of the macromonomers can vary from about 1000 to 50,000, preferably 1,000 to 10,000. The information about macromonomers in the U.S. Pat. No. 5,362,826 is incorporated herein by reference.

"Polymerization medium" means a liquid phase in which polymerization of monomers initiated by initiators takes place. Typically, the monomers and initiators are solvated or dispersed in the polymerization medium before polymerization. Often, the monomer mixture is solvated in the polymerization medium, either in one or more organic solvents, aqueous medium or a polymeric component, such as a polymer solvated or dispersed in the organic solvent or aqueous medium. If the monomer and resulting polymer are soluble in the medium, homogeneous polymerization takes place. If the monomer or resulting polymer is not soluble in the medium, heterogeneous polymerization takes place. The polymerization medium can include one or more organic solvents, an aqueous medium, or a polymeric component.

Suitable organic solvents include acetone, methyl amyl ketone, methyl ethyl ketone, Aromatic 100 from ExxonMobil Chemical, Houston, Tex. known as an aromatic solvent blend, xylene, toluene, ethyl acetate, n-butyl acetate, t-butyl acetate, butanol, and glycol ether, such as diethylene glycol monobutyl ether.

Typical aqueous polymerization medium can include water or an aqueous solution of water and miscible solvents, such as ethanol, methyl ethyl ketone, propanol, glycol ether, n-methylpyrrolidone or a combination thereof.

The polymeric component can include polyester, acrylic polymer, or a mixture thereof solvated or dispersed in one or more of the aforedescribed organic solvents or aqueous medium. The polyester suitable for use in the present invention can have a GPC weight average molecular weight exceeding 1500, preferably in the range of from 1500 to 100,000, more preferably in the range of 2000 to 50,000, still more preferably in the range of 2000 to 8000 and most preferably in the range of from 2000 to 5000. The Tg of the polyester can vary in the range of from 50° C. to +100°°C., preferably in the range of from −20° C. to +50° C. Typically, a blend of the polymeric medium containing, for example, polyester, and polymer of the present invention can be produced in situ by the polymerization process of the present invention.

For example, when used to make polymers for powder coating compositions the concentration of the monomer mixture in the reaction mixture can range from 70 to 100 weight percent. When used to make polymers for enamel coating compositions, the concentration can range from 40 to 90 weight percent. When used to make polymers for lacquer coating compositions, the concentration can range from 10 to 70 weight percent. All the foregoing weight percentages are based on the total weight of the reaction mixture. It is also possible to form the polymer in organic polymerization medium to which aqueous medium is added and the organic solvent is then stripped to form an aqueous dispersion of the polymer.

"Sub-reflux conditions" mean reactor conditions, such as pressure and temperature at which no boiling of solvents or monomers present in the polymerization medium occurs.

"Reflux conditions" mean reactor conditions, such as pressure and temperature at which boiling of solvents or monomers present polymerization medium occurs.

FIG. 1 illustrates a polymerization system 1 of the present invention, which includes one or more hybrid reactor systems 2 connected to one or more batch reactor systems 3 to make a polymer. Hybrid reactors system 2 includes one or more hybrid reactors 10. Generally, hybrid reactor 10 is made of a chemically inert material, such as stainless steel, and is rated to operate at sub-reflux gage pressures. The size of reactor 10 is chosen to meet the desired rate of making the polymer. Reactor 10 is provided with a conventional temperature probe 12, such as a thermocouple, for monitoring the temperature of a hybrid reactor reaction mixture comprising one or more hybrid reactor monomers and one or more hybrid reactor initiators in reactor 10. Reactor 10 is also provided with a conventional pressure probe, such as a load cell positioned in the dome of reactor 10 (not shown), for monitoring the pressure inside reactor 10. Thus, temperature probe 12 and the pressure probe are part of means for maintaining hybrid reactors 10 at effective hybrid polymerization temperatures and means for maintaining hybrid reactors 10 at sub-reflux polymerization gage pressures, respectively to cause polymerization of a portion or all of the hybrid reactor monomers into a polymer. The effective hybrid polymerization temperatures depend upon the type and quantity of hybrid reactor monomers, molar ratios of various monomers, type and amount of hybrid reactor initiators, type of polymerization medium, the rate at which the hybrid reactor mixture is added to reactor 10, rate at which hybrid reactor contents are taken out of reactor 10 and the sub-reflux polymerization gage pressures being maintained within reactor 10. Generally, effective hybrid polymerization temperatures range from 80° C. to 400° C., preferably from 120° C. to 300° C., and more preferably from 140° C. to 220° C. when sub-reflux polymerization gage pressures range from 0 to 2.76 MPa (0 to 400 psig), preferably from 0 to 0.69 MPa (0 to 100 psig). It should be noted that the hybrid operating pressures used in the present invention to make a polymer of a desired molecular weight range are far less than what has been tried before. As a result, the process of the present invention can be operated under safer working conditions.

Reactor 10 is preferably provided with means for detecting the mass of the hybrid reactor contents present in reactor 10 to generate a signal to indicate that reactor 10 has been filled to a preset level. Any suitable level sensing device can be used, such as for example, two or more pressure monitors, such as load cells 14A and 14B, can be preferably positioned in a vapor space 11 and preferably near the bottom of reactor 10, respectively. A pressure differential ($\Delta P$) between load cells 14A and 14B can be constantly monitored and a change in $\Delta P$ would indicate that the preset level has been reached, at which point means for generating signal can generate a signal to start opening a controllable valve 30 to convey an excess portion of the hybrid reactor contents to batch reactor system 3. Additionally, when the volume of the hybrid reactor contents drops below the preset level, the means for generating signal can generate a signal to stop the flow of the hybrid reactor contents to batch reactor system 3 by closing controllable valve 30. The means for generating signal can also generate a signal to start replenishing of hybrid monomer mixtures, hybrid initiators and polymerization medium from means 22, 24 and 26, respectively into reactors 10 so that the preset level of volume can be maintained.

Reactor 10 is further provided with means 16 for heating, which typically include a heating jacket through which heat transfer medium, such as heated oil, can be passed through. A signal to increase or reduce the temperature of the heating medium is typically generated on the basis of preset polymerization conditions, which are dynamically controlled and monitored by temperature probe 12. It should be noted that polymerization temperatures could be profiled in accordance with a preset polymerization conditions.

Reactor 10 is preferably provided with a pressure relief device 18, such as a rupture disk, which can be set at a desired emergency hybrid reactor pressure. Thus, if a severe runaway reaction condition occurs in reactor 10, which can occur very rapidly, pressure relief device 18 opens rapidly to safely and rapidly relieve the hybrid reactor pressure by rapidly dumping the hybrid reactor contents into batch reactor system 3 or into a separate dump tank (not shown). Pressure relief device 18 is typically set at 50% of the design pressure of hybrid reactor 10.

Reactor 10 is preferably provided with means 20 for agitating the hybrid reactor contents to provide thorough mixing of the hybrid reactor contents. One typical means 20 include a stirrer rotated at a desired rotation speed varied in accordance with a degree of mixing desired. Additionally, fixed baffles (not shown) may be provided on the reactor walls of reactor 10 to further improve the degree of mixing.

Reactor 10 is provided with means 22 for conveying hybrid reactor mixtures comprising one or more hybrid reactor monomers and means 24 for conveying one or more hybrid reactor initiators to one or more hybrid reactors 10. Typically means 22 and 24 include conventional means 22A and 24A for pumping the hybrid reactor monomers and the hybrid reactor initiators, respectively under pressure to reactor 10. Means 22 and 24 further include one or more tanks for storing monomers and initiators, which can be solvated or dispersed in a polymerization medium, described below, before they are conveyed to reactor 10.

Reactor 10 is preferably provided with means 26 for conveying a polymerization medium to convey the polymerization medium to reactor 10. Typically means 26 include conventional means 26A for pumping the polymerization medium under pressure to reactor 10. Means 26 further include one or more tanks for storing the polymerization medium.

Reactor 10 is preferably provided with a condenser 28, which is preferably vertically mounted, for condensing of and retuning of any vapor phase back to reactor 10. Reactor 10 is operated at constant preset hybrid reactor pressures or pressures that are profiled in accordance with a preset polymerization conditions. One of the ways to achieve such conditions is by controlled venting of vapor space 11 through a controlled valve 29A and pumping in inert gas at a desired pressure, such as nitrogen, argon, carbon dioxide, or a mixture thereof, through controlled valve 29B in vapor space 11. The use of inert gas is preferred to prevent undesired reactions from occurring in reactor 10. Reactor 10 is further provided with controllable valve 30 to convey the hybrid reactor contents to batch reactor system 3 of the present invention.

FIG. 1 illustrates hybrid reactor connected to a batch reactor 32, via valve 30. The volume of hybrid reactor 10 is calculated on the basis of the throughput of the polymer desired. Due to high pressures and temperatures, the rate of polymerization in hybrid reactor 10 is generally higher than that taking place in batch reactor 32. As a result, generally the volume of hybrid reactor 10 is less than that of batch reactor 32 and it generally varies from 1% to 90%, preferably from 5% to 50% and more preferably from 10% to 40% of the total volume of batch reactor 32. Typical sizes of batch reactor 32 can range from 1 liter (0.26 gallons) to 75,700 liters (20,000 gallons). Hybrid reactor 10 is preferably positioned above batch reactor 32 to gravimetrically assist in conveying the hybrid reactor contents to batch reactor 32. However, it is within the purview of this invention to position hybrid reactor 10 in any advantageous position with respect to batch reactor 32, including providing pumping means to facilitate in the conveying the hybrid reactor contents from hybrid reactor 10 to batch reactor 32.

Batch reactor 32 is made of a chemically inert material, such as stainless steel, and is rated to operate at reflux gage pressures, which is typically at atmospheric pressure. The size of reactor 32 is chosen to meet the desired rate of making the polymer as discussed above. Reactor 32 is provided with a conventional temperature probe 34, such as a thermocouple, for monitoring the temperature of a batch reactor reaction mixture comprising one or more batch reactor monomers and one or more batch reactor initiators in reactor 32. Reactor 32 is also provided with a conventional pressure probe, such as a load cell positioned in the dome of reactor 32 (not shown), for monitoring the pressure inside reactor 32. Thus, temperature probe 34 and the pressure probe are part of means for maintaining batch reactors 32 at effective batch polymerization temperatures and means for maintaining batch reactors 32 at reflux polymerization gage pressures, respectively to cause polymerization of a remaining portion of the hybrid reactor monomers into the polymer and to cause polymerization of batch reactor monomers into the polymer. The effective batch polymerization temperatures depend upon the type and quantity of hybrid reactor and batch reactor monomers, molar ratios of various monomers, type and amount of batch reactor initiators, type of polymerization medium, the rate at which the hybrid reactor content are conveyed to reactor 32, the rate at which batch reactor mixture is added to reactor 32, and the reflux polymerization gage pressures being maintained within reactor 32. Generally, effective batch polymerization temperatures range from 80° C. to 300° C., preferably from 100° C. to 250° C., and more preferably from 120° C. to 200° C. when reflux polymerization gage pressures range from 0 to 2.07 MPa (0 to 300 psig), preferably from 0 to 0.69 MPa (0 to 100 psig).

Batch reactor 32 is further provided with means 36 for heating, which typically includes a heating jacket through which heat transfer medium, such as oil, can be passed through. A signal to increase or reduce the temperature of the heating medium is typically generated on the basis of preset polymerization conditions, which are dynamically controlled and monitored by temperature probe 34. It should be noted that polymerization temperatures could be profiled in accordance with a preset polymerization conditions.

Reactor 32 is preferably provided with a pressure relief device 50, such as a rupture disk, which can be set at a desired emergency hybrid reactor pressure. Thus, if a severe runaway reaction condition occurs in reactor 32, which can occur very rapidly, pressure relief device 18 opens rapidly to safely and rapidly relieve the hybrid reactor pressure and dump the batch reactor contents in a dump tank (not shown).

Reactor 32 is preferably provided with means 38 for agitating the batch reactor contents to provide thorough mixing of the batch reactor contents. One typical means 38 include a stirrer rotated at a desired rotation speed varied in accordance with a degree of mixing desired. Additionally, fixed baffles (not shown) may be provided on the reactor walls of reactor 32 to further improve the degree of mixing.

Reactor 32 is provided with means 40 for conveying batch reactor mixtures comprising one or more batch reactor monomers and means for conveying 42 one or more batch reactor initiators to one or more batch reactors 32. Means 40 and 42 further include one or more tanks for storing monomers and initiators, which can be solvated or dispersed in a polymerization medium, described below, before they are conveyed to reactor 32.

Reactor 32 is preferably provided with means 44 for conveying a polymerization medium to convey the polymerization medium to reactor 32. Means 44 further include one or more tanks for storing the polymerization medium. It should be noted that means 40, 42 and 44 could be provided with conventional pumping means.

Reactor 32 is preferably provided with a condenser 46, which is preferably vertically mounted, for condensing of and returning of any vapor phase back to reactor 32. Reactor 32 is operated at reflux pressures. One of the ways to achieve such conditions is by controlled venting of vapor space 33 by pumping in the aforedescribed inert gas into vapor space 33. The use of inert gas under a desired pressure is preferred to prevent undesired reactions from occurring in reactor 32. Once the polymerization in reactor 32 is completed, the contents of the batch reactor are conveyed via a controllable valve 48 into a holding tank for further processing such as making a composition, such as a coating composition suitable for use in automotive OEM or refinish applications.

The present invention is preferably directed to a single hybrid reactor 10 connected to a single batch reactor 32. Additionally, all the monomers to be polymerized are preferably conveyed to hybrid reactor 10, batch reactor 32 being used to complete the polymerization of any remaining unpolymerized hybrid reactor monomers present in the hybrid reactor contents by preferably using the same or similar type of hybrid reactor initiator as a batch reactor initiator. Additionally, the polymerization medium is preferably conveyed to hybrid reactor 10 before the hybrid reactor mixture is conveyed and the polymerization medium is preferably conveyed to batch reactor 32 after the hybrid reactor contents conveyed to batch reactor 32. In the foregoing instant, the polymerization medium is preferably brought to effective hybrid polymerization temperatures and sub-reflux polymerization gage pressures before the hybrid reactor mixture is conveyed. Similarly, the polymerization medium is preferably brought to effective batch polymerization temperatures and reflux polymerization gage pressures once the hybrid reactor contents are conveyed to batch reactor 32.

Figure 2:
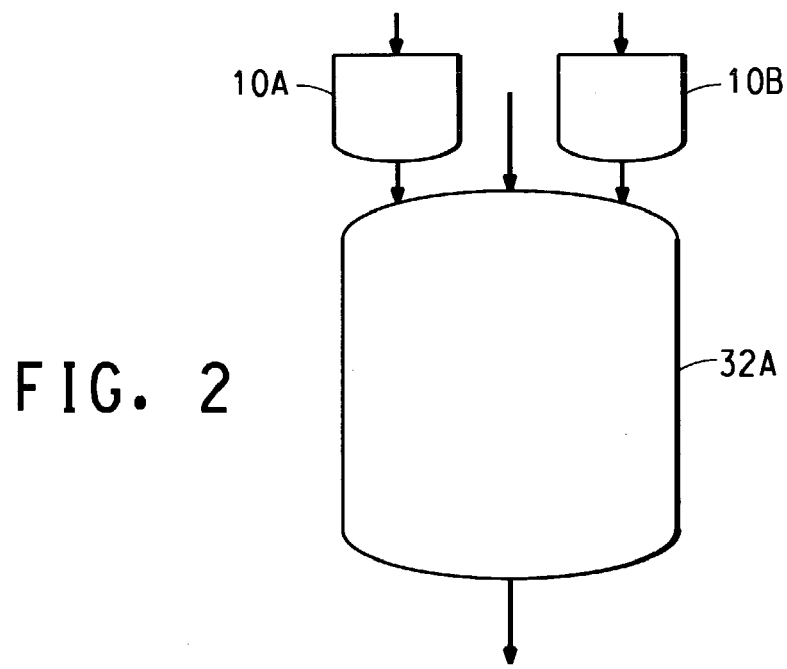
FIGS. 2, 3 and 4 are schematic representation of other embodiments of the polymerization system of the present invention.

FIG. 2 illustrates another embodiment of the polymerization system of the present invention. Unless otherwise noted, all the components not referenced will be similar to those illustrated in FIG. 1 and described earlier. The polymerization system of FIG. 2 includes:

means for conveying first hybrid reactor mixtures comprising one or more first hybrid reactor monomers and one or more first hybrid reactor initiators to a first hybrid reactor 10A;

means for maintaining first hybrid reactor 10A at effective first hybrid polymerization temperature and means for maintaining first hybrid reactor 10A at first sub-reflux polymerization gage pressure to cause polymerization of a portion of said first hybrid reactor monomers into a polymer;

means for conveying second hybrid reactor mixtures comprising one or more second hybrid reactor monomers and one or more second hybrid reactor initiators to a second hybrid reactor 10B;

means for maintaining second hybrid reactor 10B at effective second hybrid polymerization temperature and means for maintaining second hybrid reactor 10B at second sub-reflux polymerization gage pressure to cause polymerization of another portion of said first hybrid reactor monomers and a portion of said second hybrid reactor monomers into said polymer;

means for conveying first hybrid reactor contents from first hybrid reactor 10A to a batch reactor 32A;

means for conveying second hybrid reactor contents from second hybrid reactor 10B to batch reactor 32A;

means for conveying batch reactor mixtures comprising one or more batch initiators to batch reactor 32A; and means for maintaining batch reactor 32A at effective batch polymerization temperature and means for maintaining batch reactor 32A at reflux polymerization pressure to cause polymerization of remaining portions of said first and second hybrid reactor monomers into said polymer.

Figure 3:
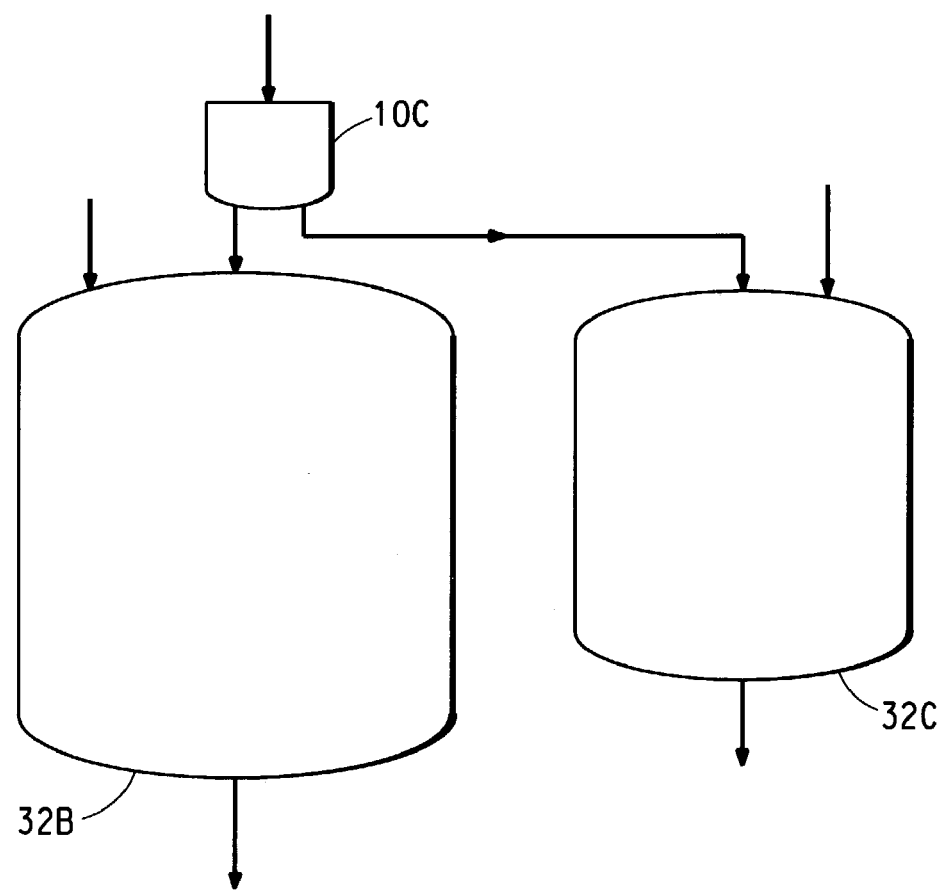

FIG. 3 illustrates another embodiment of the polymerization system of the present invention. Unless otherwise noted, all the components not referenced will be similar to those illustrated in FIG. 1 and described earlier. The polymerization system of FIG. 3 includes:

means for conveying hybrid reactor mixtures comprising one or more hybrid reactor monomers and one or more hybrid reactor initiators to a hybrid reactor 10C;

means for maintaining hybrid reactor 10C at effective hybrid polymerization temperature and means for maintaining hybrid reactor 10C at sub-reflux polymerization gage pressure to cause polymerization of a portion of said hybrid reactor monomers into a polymer;

means for conveying portions of hybrid reactor contents from hybrid reactor 10C to a first batch reactor 32B and a second batch reactor 32C;

means for conveying first batch reactor mixture comprising one or more batch initiators to first batch reactor 32B;

means for conveying second batch reactor mixture comprising one or more batch initiators to second batch reactor 32C;

means for maintaining first batch reactor 32B at effective first batch polymerization temperature and means for maintaining first batch reactor 32B at reflux polymerization pressure to cause polymerization of the portion of said hybrid reactor monomers conveyed from hybrid reactor 32B into said polymer; and means for maintaining second batch reactor 32C at effective second batch polymerization temperature and means for maintaining second batch reactor 32C at reflux polymerization pressure to cause polymerization of the portion of said hybrid reactor monomers conveyed from hybrid reactor 10C into said polymer.

Figure 4:
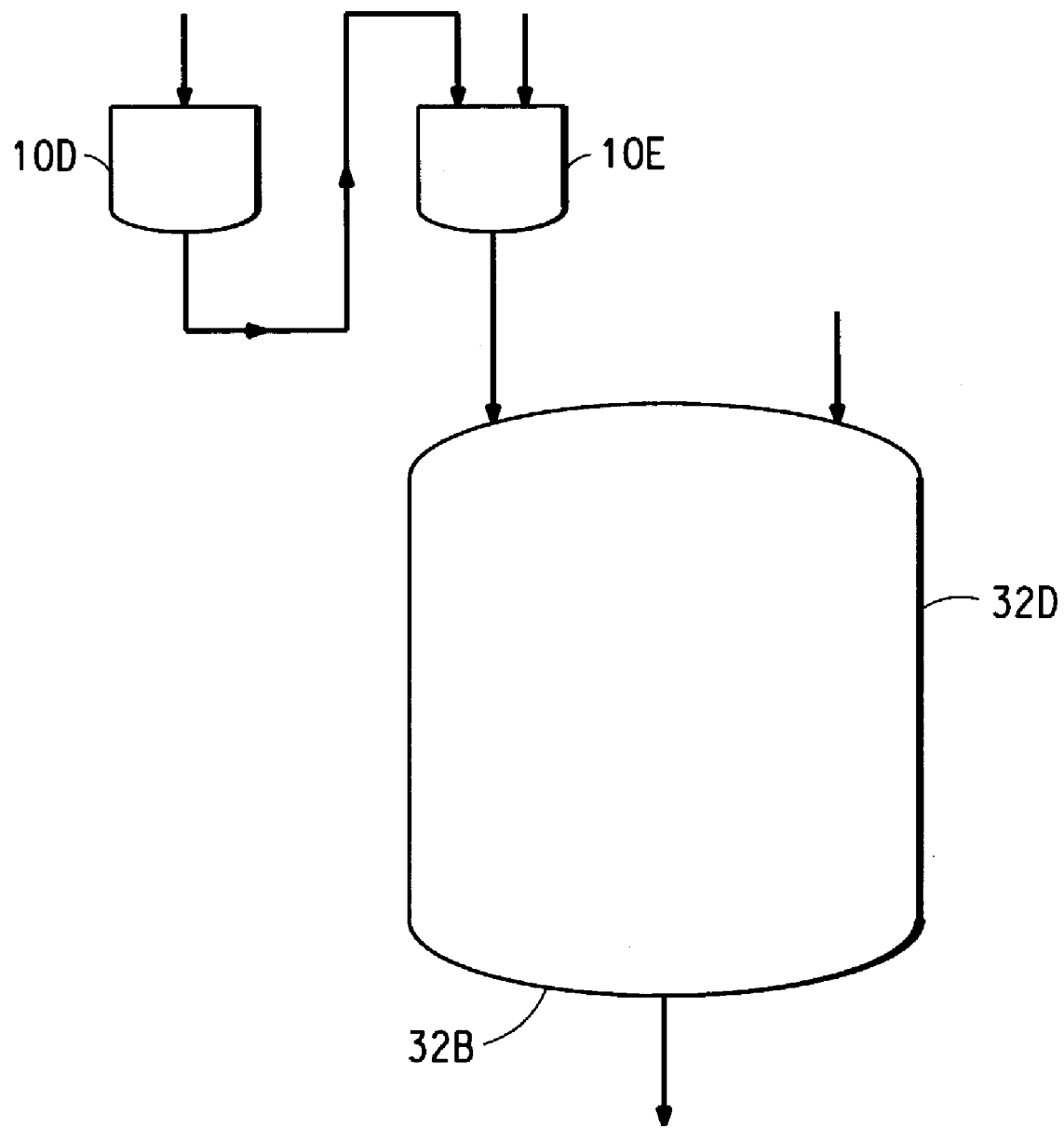

FIG. 4 illustrates still another embodiment of the polymerization system of the present invention. Unless otherwise noted, all the components not referenced will be similar to those illustrated in FIG. 1 and described earlier. The polymerization system of FIG. 3 includes:

means for conveying first hybrid reactor mixtures comprising one or more first hybrid reactor monomers and one or more first hybrid reactor initiators to a first hybrid reactor 10D;

means for maintaining first hybrid reactor 10D at effective first hybrid polymerization temperature and means for maintaining said first hybrid reactor at first sub-reflux polymerization gage pressure to cause polymerization of a portion of said first hybrid reactor monomers into a polymer;

means for conveying first hybrid reactor contents from first hybrid reactor 10D to a second hybrid reactor 10E;

means for conveying second hybrid reactor mixtures comprising one or more second hybrid reactor monomers and one or more second hybrid reactor initiators to second hybrid reactor 10E;

means for maintaining second hybrid reactor 10E at effective second hybrid polymerization temperature and means for maintaining second hybrid reactor 10E at second sub-reflux polymerization gage pressure to cause polymerization of another portion of said first hybrid reactor monomers and a portion of said second hybrid reactor monomers into said polymer;

means for conveying second hybrid reactor contents from second hybrid reactor 10E to a batch reactor 32D;

means for conveying batch reactor mixtures comprising one or more batch initiators to batch reactor 32D; and means for maintaining batch reactor 32D at effective batch polymerization temperature and means for maintaining batch reactor 32D at reflux polymerization pressure to cause polymerization of remaining portions of said first and second hybrid reactor monomers into said polymer.

It should be noted that by opting to include different monomers and initiators in hybrid reactors 10, 10A, 10B, 10C, 10D and 10E and in batch reactors 32, 32A, 32B, 32C and 32D, the polymerization systems of FIGS. 1, 2, 3 and 4 can be used to make polymers in the form of a homopolymer, copolymer, block polymer, graft or comb copolymer, branched polymer, branch-upon-branch polymer, non-aqueous polymer dispersion, star polymer, and ladder polymer.

The present invention is also directed to a process for producing a polymer comprising the following steps:

I. Conveying from conveying means 22 and 24 hybrid reactor mixtures comprising one or more hybrid reactor monomers and one or more hybrid reactor initiators, respectively to one or more hybrid reactors 10A maintained at effective hybrid polymerization temperatures and sub-reflux polymerization gage pressures to cause polymerization of a portion of said hybrid reactor monomers into said polymer. Generally, the portion of the hybrid monomers polymerized in hybrid reactors 10 ranges from 30 weight percent to 99 weight percent, preferably from 50 weight percent to 90 weight percent and preferably from 60 weight percent to 85 weight percent, all percentages based on the total amount of hybrid monomers conveyed to hybrid reactors 10. The hybrid reactor mixture can contain a polymerization medium described earlier. It should be noted that effective polymerization temperatures are maintained by monitoring the temperature of the contents of the hybrid reactor 10A by hybrid reactor temperature probe 12 and then increasing or lowering the heat provided means 16 for heating in accordance with a preset polymerization temperature.

II. Conveying hybrid reactor contents via controllable valve 30 to one or more batch reactors 32 maintained at effective batch polymerization temperatures and reflux polymerization pressures to cause polymerization of a remaining portion of the hybrid reactor monomers into said polymer.

In the present process, the polymerization medium is preferably conveyed to hybrid reactors 10 before the hybrid reactor mixtures are conveyed to hybrid reactor 10.

In the present process, an excess portion of the hybrid reactor contents can be conveyed to batch reactors 32 once hybrid reactors 10 are filled to preset levels. The maintenance of the present levels in hybrid reactor 10 can be achieved by utilizing the following process steps:

detecting the mass reactor contents present in hybrid reactors 10 and generating signal to open controllable valve 30 to convey of an excess portion of the hybrid reactor contents to batch reactor system 3.

In the present process, the portion of the hybrid reactor monomers polymerized in hybrid reactors 10 ranges from 30 weight percent to 99 weight percent, preferably ranges from 50 weight percent to 90 weight percent and more preferably ranges from 60 weight percent to 85 weight percent, all based on the total amount of hybrid reactor monomers conveyed to hybrid reactors 10. By utilizing hybrid/batch reactor combination of the present invention, for the same throughput of the polymer produced, one can reduce the time of polymerization typically by an hour to two hours, since the time required to heat a single conventional larger size batch reactor to polymerization temperatures would be longer than a smaller size hybrid reactor 10.

If desired, a solution of the hybrid reactor initiators in the polymerization medium is conveyed to hybrid reactors 10.

Typical monomers suitable for use in the hybrid reactor mixture or batch reactor mixtures include one or more of the following:

One or more acrylate monomers having alkyl carbon atoms in the range of from 1 to 18, preferably in the range of from 1 to 12. More particularly, suitable acrylate monomers include methyl (meth)acrylate, ethyl (meth)acrylate, propyl (meth)acrylate, butyl (meth)acrylate, 2-ethylhexyl (meth)acrylate, isobutyl (meth)acrylate, isobornyl (meth)acrylate, benzyl (meth)acrylate, and phenyl (meth)acrylate.

One or more functional acrylic monomers, such as glycidyl (meth)acrylate, 2-hydroxyethyl (meth)acrylate, 2-hydroxypropyl (meth)acrylate, 3-hydroxypropyl (meth)acrylate, hydroxybutyl (meth)acrylate, diethylaminoethyl (meth)acrylate, triethyleneglycol (meth)acrylate, diethylaminoethyl (meth)acrylate, and triethyleneglycol (meth)acrylate.

One or more acid monomers, such as (meth)acrylic acid, itaconic acid, vinyl benzoic acid, alphamethylvinyl benzoic acid, and p-vinyl benzene sulfonic acid.

Nitrile monomers, such as (meth)acrylonitrile.

Styrene and one or more styrenic monomers, such alpha methyl styrene, diethylamino styrene, diethylamino alphamethylstyrene, and paramethylstyrene.

One or more amides, such as methacrylamide, N-tert-butyl methacrylamide, N-n-butyl methacrylamide, N-methylol methacrylamide, N-ethylol methacrylamide, N-tert-butyl acrylamide, N-n-butyl acrylamide, N-methylol acrylamide, and N-ethylol acrylamide.

One or more silyl monomers, such as trimethoxysilylpropyl (meth)acrylate, triethoxysilylpropyl (meth)acrylate, tributoxysilyipropyl (meth)acrylate, dimethoxymethylsilylpropyl (meth)acrylate, diethoxymethylsilylpropyl (meth) acrylate, dibutoxymethylsilylpropyl (meth)acrylate, diisopropoxymethylsilylpropyl (meth)acrylate, diimethoxysilylpropyl (meth)acrylate, diethoxysilylpropyl (meth)acrylate, dibutoxysilyipropyl (meth)acrylate, and diisopropoxysilylpropyl (meth)acrylate.

One or more vinyl monomers, such as vinyl silane, vinyl acetate, vinyl butyrate, vinyl chloride, vinyl fluoride, and vinyl bromide.

Typical initiators suitable for use in the hybrid reactor mixture or batch reactor mixtures include one or more of any source of radicals or any of the known class of polymerization initiators, provided the initiator has the requisite solubility in the solvent or monomer mixture chosen and has an appropriate half-life at the temperature of polymerization. The initiators may be redox initiators, thermal initiators, photochemical initiators, or a combination thereof. The thermal initiators are preferred, particularly, azo initiators, peroxide initiators, and persulfate initiators. Preferably, the initiator has a half-life of from about 1 minute to about 1 hour at the temperature of polymerization. Some suitable initiators include ammonium persulfate, azocumene; 2,2'-azobis(isobutyronitrile) (Vazoo® 64 thermal initiator supplied by Du Pont Company, Wilmington, Del.); 4,4'-azobis(4-cyanovaleric acid) (Vazo® 52 thermal initiator supplied by Du Pont Company, Wilmington, Del.) and 2-(t-butylazo)-2-cyanopropane, benzoyl peroxide, t-butyl peroxyacetate, di-tertiary-butyl peroxide, t-buyl peroxypivalate. Additional azo and peroxide initiators include 2,2'-azobis(isobutyronitrile), 2,2'-azobis(2-methylbutanenitrile), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'azobis[2-methyl-N-(1,1)-bis(hydoxymethyl)-2-hydroxyethyl] propionamide, 2,2'-azobis[2-methyl-N-hydroxyethyl)]-propionamide, 2,2'-azobis(N,N'-dimethyleneisobutyramidine) dihydrochloride, 2,2'-azobis(2-amidinopropane)dihydrochloride, 2,2'-azobis(N,N'-dimethyleneisobutyramine), 2,2'-azobis(2-methyl-N-[1,1-bis(hydroxymethyl)-2-hydroxyethyl] propionamide), 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, or dicumyl hyponitrite. Other non-azo initiators having the requisite solubility and appropriate half-life may also be used.

Typical quantities of initiator used ranges from 0.1 weight percent to 10 weight percent based on total weight of monomers in the reaction mixture.

The process of the present invention can be readily run in a safe working manner by conveying a portion or all of the hybrid reactors contents from hybrid reactors 10 to batch reactors 32, if the pressures in hybrid reactors 10 exceed above a preset unsafe hybrid reactor pressures, described earlier.

The process further includes rinsing hybrid reactors 10 with a chaser portion of the polymerization medium after all of the hybrid reactor contents had been conveyed to batch reactors 32; and then conveying the chaser portion to batch reactors 32.

The process of the present invention produces a polymer, particularly acrylic polymer polymerized from one or a combination of (meth)acrylic monomers, acrylonitriles, acrylamides, styrenic monomers, and vinyl silane. The acrylic polymer can have a GPC weight average molecular weight exceeding 5000, preferably in the range of from 5000 to 20,000, more preferably in the range of 6000 to 20,000, and most preferably in the range of from 8000 to 12,000. The Tg of the acrylic polymer varies in the range of from 0° C. to 100° C., preferably in the range of from 30° C. to 80° C.

The polymer made by the process of the present invention is suited for use in coating compositions, such as OEM and refinish coating compositions used in automotive applications.

The process of the present invention can be also used for producing a graft copolymer. Such a process includes the following steps:

I. Conveying hybrid reactor mixtures comprising one or more hybrid reactor monomers and one or more hybrid reactor initiators to one or more hybrid reactors 10 maintained at effective hybrid polymerization temperatures and sub-reflux polymerization gage pressures to cause polymerization of said hybrid monomers into macromonomers.

II. Conveying hybrid reactor contents to one or more batch reactors 32 maintained at effective batch polymerization temperatures and reflux polymerization pressures.

III. Conveying batch reactor mixtures comprising one or more batch reactor monomers and one or more batch reactor initiators to cause polymerization of said batch reactor monomers into a backbone of said graft copolymer having said macromonomers grafted onto said backbones.

The foregoing graft copolymer process includes conveying on or more chain transfer catalysts to provide said macromonomers with an unsaturated terminal group. The chain transfer agent can be any compound, which contains $CO^{+2}$. Cobalt chelates are preferred, especially those described in U.S. Pat. No. 4,680,352 to Janowicz and Melby and U.S. Pat. No. 4,722,984 to Janowicz. Most preferred are pentacyanocobaltate (II) diaquabis(borondi fiuorodi methylglyoximato) cobaltate (II) and diaquabis(borondifluorodiphenylglyoximato)cobaltate. The chain transfer agent is generally used at concentration of about 5 to 150 weight parts per million based on the total weight of the monomer mixture.

In the foregoing graft copolymer process the hybrid reactor contents and the batch reactor mixtures are preferably conveyed simultaneously to batch reactors 32 or the hybrid reactor contents are preferably conveyed to batch reactors 32 after the conveying of a portion or all of the batch reactor monomers to batch reactors 10.

In the foregoing graft copolymer process, a portion or all of the batch reactor initiators is preferably conveyed simultaneously with the batch reactor monomers or with the hybrid reactor contents to batch reactors 32.

The foregoing graft copolymer process preferably includes conveying the polymerization medium to hybrid reactors 10, batch reactors 32; or to both before conveying the hybrid reaction mixtures to hybrid reactors 10.

The foregoing graft copolymer process preferably includes conveying the polymerization medium to hybrid reactors 10 before conveying the hybrid reaction: mixtures to hybrid reactors 10.

The foregoing graft copolymer process preferably includes conveying the polymerization medium to batch reactors 32 before conveying the hybrid reactor contents to batch reactors 32.

The foregoing graft copolymer process preferably includes conveying the polymerization medium to batch reactors 32 before conveying the batch reactor mixtures to batch reactors 32.

The foregoing graft copolymer process preferably includes conveying the polymerization medium to batch reactors 10 before conveying the batch reactor mixtures and the hybrid reactors contents to batch reactors 10.

In any of the foregoing graft copolymer process steps, a solution of the hybrid reactor initiators in a portion of the polymerization medium could be conveyed to hybrid reactors 10.

In any of the foregoing graft copolymer process steps, a solution of the batch reactor initiators in a portion of the polymerization medium could be conveyed to batch reactors 32.

In any of the foregoing graft copolymer process steps, a solution of the hybrid reactor initiators in a portion of the polymerization medium can be conveyed to hybrid reactors 10; and a solution of the batch reactor initiators in another portion of the polymerization medium can be conveyed to batch reactors 32. The foregoing process could be also used for producing block copolymers.

The process of the present invention can be also used for producing a polymer blend. Such a process includes:
  conveying the hybrid reactor mixtures comprising one or more hybrid reactor monomers and one or more hybrid reactor initiators to one or more hybrid reactors 10 maintained at effective hybrid polymerization temperatures and sub-reflux polymerization gage pressures to cause polymerization of the hybrid monomers into a hybrid reactor polymer;
  conveying hybrid reactor contents to one or more batch reactors 32 maintained at effective batch polymerization temperatures and reflux pressures; and
  conveying batch reactor mixtures comprising one or more batch reactor monomers and one or more batch reactor initiators to cause polymerization of the batch reactor monomers into a batch reactor polymer to form the polymer blend of the hybrid reactor polymer and the batch reactor polymer.

As indicated earlier, the polymers made according to the present invention have wide utility, especially for use as binders in coating compositions (particularly high performance coatings used in automotive finishes and industrial maintenance coating compositions), inks, adhesives, and sealants, or basically wherever one skilled in the art would use polymeric material. Such final products or compositions can have advantageous structural characteristics and properties associated with the use of the present polymers. Moreover, the graft copolymers, comb copolymers, oligomers, block copolymers prepared according to the present invention can be used to improve coating properties, such as, for example improved VOC (by lowering the content of volatile organic compounds), better crosslink density, better pot life, better environmental resistance, faster cure, and improved hardness.

The coating composition can be made conventionally by mixing the polymer of the present invention with conventional composition additives, such as, pigments, metallic flakes, hollow glass beads, UV absorbers, stabilizers, rheology control agents, flow agents, reinforcing fibers, toughening agents and fillers. Such additional additives will, of course, depend upon the intended use of the coating composition. Fillers, pigments, and other additives that would adversely affect the clarity of the cured coating are typically not included if the composition is intended as a clear coating.

The present invention is also suitable for producing microgels, which are macromolecules that possess a very high molecular weight and yet a low viscosity similar to linear or branched polymers of relatively low molecular weight. Microgels are an intermediate structure between conventional linear or branched polymers such as-polyethylene or polycarbonate and networks such as vulcanized natural rubber The dimensions of microgels are comparable with high molecularweight linear polymers but their internal structure resembles a network. The properties of microgels make them particularly useful in a wide range of applications such as in additives, in advanced material formulations for foams or fibers, in coating compositions, binders and redispersible polymers. Microgels can also be used to improve the ease of processing and to improve the structural strength and dimensional stability of the final products. A further potential use for microgels is as additives for high impact polymers. Microgels embedded in a matrix of conventional linear polymer can act to stabilize the whole structure by distributing mechanical tension. Microgels are also useful in biological systems and as pharmaceutical carriers. The commonly assigned U.S. Pat. No. 6,355,718, which describes the typical monomers and steps used to produce the microgels, is incorporated herein be reference.

EXAMPLES

Comparative Copolymer 1

To a 2-liter flask fitted with an agitator, water condenser, thermocouple, nitrogen inlet, heating mantle, and addition pumps and ports was added 305.3 g. of xylene supplied by ExxonMobil, Houston, Tex., which was agitated and heated to reflux temperature (137° C. to 142° C.). A monomer mixture comprising of 106.1 g of styrene (Styrene from BP Amoco, Texas City, Tex.), 141.4 g. methyl methacrylate (MMA from Lucite International, Inc. Cordova, Tenn.), 318.3 g. iso-butyl methacrylate (I-205 from Lucite International, Inc. Cordova, Tenn.), 141.4 g. hydroxyethyl methacrylate (Rorcryl® 400 from Rohm and Haas Company, Philadelphia, Pa.) and 10.4 g of xylene supplied by ExxonMobil, Houston, Tex. was then added to the flask via the addition pumps and ports simultaneously with an initiator mixture comprising 17.0 g. t-butyl peracetate (Luperox® 7M75 initiator from Atofina, Philadelphia, Pa.) and 85.2 g. xylene supplied by ExxonMobil, Houston, Tex. The monomer mixture was added over 180 minutes and the addition time for the initiator mixture was also 180 minutes. The batch was held at reflux (137° C. to 142° C.) throughout the polymerization process. An initiator mixture comprising of 4.3 g. t-butyl peracetate (Luperox® 7M75 initiator from Atofina, Philadelphia, Pa.) and 57.8 g. of methyl ethyl ketone was then immediately added to the reaction mixture over 60 minutes and the batch was subsequently held at reflux for 60 minutes. The batch was then cooled to below 90° C. and 13.0 g. of methyl ethyl ketone were added. The amount of the initiator solution used was 3.0 weight percent based on the total weight of the monomer mixture. The resulting polymer solution has weight solids of 60% and viscosity of 14,400 cps. The number average molecular weight of the resulting hydroxy functional acrylic copolymer was 5,000 and weight average molecular weight was 11,000, as determined by gel permeation chromatography (polystyrene standard).

Copolymer 1

To 1-liter hybrid reactor 10 fitted with heating jacket 16, stirrer 20, feed lines from means 22 for conveying hybrid reactor monomers, means 24 for conveying hybrid reactor initiator, and means 26 for conveying polymerization medium, an initial polymerization-medium charge of 355.0 g. of xylene supplied by ExxonMobil, Houston, Tex. was added from means 26. The polymerization medium was heated to 187° C. under sub-reflux at 54.7 psia (0.38 MPa) in reactor 10. A hybrid monomer mixture of 462.4 g. styrene (Styrene from BP Amoco, Texas City, Tex.), 616.5 g. of hydroxy ethyl methacrylate (Rorcryl® 400 from Rohm and Haas Co., Philadelphia, Pa.), 616.5 g. of methyl methacrylate (MMA from Lucite International, Inc. Cordova, Tenn.), 1387.2 g of isobutyl methacrylate (I-205 from Lucite International, Inc. Cordova, Tenn.) and 88.2 g. of xylene supplied by ExxonMobil, Houston, Tex. as solvent was added to reactor 10 over a period of 240 minutes in such a way that the level in the reactor 10 was held constant at 0.55 liters and an excess portion of the hybrid reactor contents was fed to an attached 12-liter batch reactor 32 fitted with heating jacket 36, stirrer 38, water cooled condenser with nitrogen purge 46 and a feed line from means 44 for conveying batch reactor initiator. Simultaneously, a hybrid initiator mixture of 27.7 g of tertbutyl peroxyacetate (Luperoxo® 7M75 initiator from Atofina, Philadelphia, Pa.) from means 24 and 1063.4 g of xylene supplied by ExxonMobil, Houston, Tex. from means 26 was added over a period of 240 minutes to reactor 10 under sub-reflux at 54.7 psia (0.38 MPa). A polymerization temperature of 190° C. was maintained in reactor 10 over the entire reaction time. After completion of the feeds to reactor 10, it was drained over 25 minutes into reactor 32. Once transfer from reactor 10 to reactor 32 began, reactor 32 was heated to reflux at 140° C. Thirty-three minutes thereafter, a batch initiator mixture of 0.9 g. of tert-butyl peroxyacetate (Luperox® 7M75 initiator from Atofina, Philadelphia, Pa.) from means 42 and 18.2 g. of xylene supplied by ExxonMobil, Houston, Tex. from means 44 were added all at once to reactor 32. Directly thereafter, another batch initiator mixture of 8.3 g. of tert-butyl peroxyacetate (Luperox® 7M75 initiator from Atofina, Philadelphia, Pa.) from means 42 and 171.2 g. of xylene supplied by ExxonMobil, Houston, Tex. from means 44 were fed to reactor 32 over 230 minutes. Once the initiator feed was complete, still another batch initiator mixture of 12.3 g. of Luperox® 7M75 initiator from means 42 and 213.9 g. of xylene supplied by ExxonMobil, Houston, Tex. from means 44 were fed over half an hour to reactor 32. The amount of the initiator solution used was 1.6 weight percent based on the total weight of the monomer mixture. The reactor 32 was held at reflux for 1 hour and cooled to 80° C. An additional charge of 85.4 g. of xylene supplied by ExxonMobil, Houston, Tex. from means 44 was added to reactor 32 and the batch filled out.

The resulting copolymer @ 60.5% solids had a GPC Mn of 5512 and GPC Mw of 10997 using a polystyrene standard.

One can note by comparing Copolymer 1 to Comparative Copolymer 1 that for producing a polymer having substantially similar molecular weights, the process of the present invention utilizes just about half the amount of initiator (1.6% versus 3.0%).

Copolymer 2

To 1-liter hybrid reactor 10 fitted with heating jacket 16, stirrer 20, feed lines from means 22 for conveying hybrid reactor monomers, means 24 for conveying hybrid reactor initiator, and means 26 for conveying polymerization medium, an initial polymerization medium charge of 348.6 g of 2-heptanone (methyl amyl ketone from Eastman Chemical, Kingsport, Tenn.) was added from means 26. The polymerization medium was heated to 190° C. under sub-reflux at 54.7 psia (0.38 MPa) in reactor 10. A hybrid monomer mixture of 1138.2 g of hydroxy ethyl methacrylate (Rorcryl® 400 from Rohm and Haas Co., Philadelphia, Pa.), 1938.0 g of isobornyl acrylate (SR-506 isobornyl acrylate from Sartomer Resin, Channelview, Tex.) and 82.0 g of 2-heptanone (methyl amyl ketone from Eastman Chemical, Kingsport, Tenn.) 462.4 g as solvent was added to reactor 10 over a period of 280 minutes in such a way that the level in the reactor 10 was held constant at 0.55 liters and an excess portion of the hybrid reactor contents was fed to an attached 12-liter batch reactor 32 fitted with heating jacket 36, stirrer 38, water cooled condenser with nitrogen purge 46 and a feed line from means 44 for conveying batch reactor initiator. Simultaneously, a hybrid initiator mixture of 92.3 g of tert-butyl peroxyacetate (Luperox® 7M75 initiator from Atofina, Philadelphia, Pa.) from means 24 and 1045.9 g of 2-heptanone (methyl amyl ketone from Eastman Chemical, Kingsport, Tenn.) from means 26 was added over a period of 280 minutes to reactor 10 under sub-reflux at 54.7 psia (0.38 MPa) in reactor 10. Polymerization temperature of 190° C. was maintained in reactor 10 over the entire reaction time. After completion of the feeds to reactor 10, it was drained over 25 minutes into reactor 32. Once transfer from reactor 10 to reactor 32 began, reactor 32 was heated to reflux at 157° C. Forty minutes thereafter, a batch initiator mixture of 9.2 g of tert-butyl peroxyacetate (Luperox® 7M75 initiator from Atofina, Philadelphia, Pa.) from means 42 and 38.9 g of 2-heptanone (methyl amyl ketone from Eastman Chemical, Kingsport, Tenn.) from means 44 were added all at once to reactor 32. Directly thereafter, another batch initiator mixture of 83.1 g of tert-butyl peroxyacetate (Luperox® 7M75 initiator from Atofina, Philadelphia, Pa.) from means 42 and 350.7 g of 2-heptanone (methyl amyl ketone from Eastman Chemical, Kingsport, Tenn.) from means 44 were fed to reactor 32 over 270 minutes. The amount of the initiator solution used was 6.0 weight percent based on the total weight of the monomer mixture. The reactor 32 was held at reflux for 1 hour and cooled to 80° C. and the batch filled out.

The resulting copolymer @ 60.5% solids had a GPC Mn of 1704 and GPC Mw of 3380 using a polystyrene standard.

Copolymer 3

To 1-liter hybrid reactor 10 fitted with heating jacket 16, stirrer 20, feed lines from means 22 for conveying hybrid reactor monomers, means 24 for conveying hybrid reactor initiator, and means 26 for conveying polymerization medium, an initial polymerization medium charge of 268.4 g of xylene supplied by ExxonMobil, Houston, Tex. was added from means 26. The polymerization medium was heated to 190° C. under sub-reflux at 54.7 psia (0.38 MPa) in reactor 10. A hybrid monomer mixture of 2489.9 g of isobutyl methacrylate (IBMA from Lucite International, Inc., Cordova, Tenn.), 1067.1 g of hydroxy ethyl acrylate (Rocryl® 420 HEA from Rohm and Haas, Philadelphia, Pa.) and 33.3 g of xylene supplied by ExxonMobil, Houston, Tex. as solvent was added to reactor 10 over a period of 240 minutes in such a way that the level in the reactor 10 was held constant at 0.55 liters and an excess portion of the hybrid reactor contents was fed to an attached 12-liter batch reactor 32 fitted with heating jacket 36, stirrer 38, water cooled condenser with nitrogen purge 46 and a feed line from means 44 for conveying batch reactor initiator. Simultaneously, a hybrid initiator mixture of 14.5 g of tert-butyl peroxyacetate (Luperox® 7M75 initiator from Atofina, Philadelphia, Pa.) from means 24 and 803.4 g of xylene supplied by ExxonMobil, Houston, Tex. from means 26 was added over a period of 240 minutes to reactor 10 under sub-reflux at 54.7 psia (0.38 MPa) in reactor 10. Polymerization temperature of 190° C. was maintained in reactor 10 over the entire reaction time. After completion of the feeds to reactor 10, it was drained over 25 minutes into reactor 32. Once transfer from reactor 10 to reactor 32 began, reactor 32 was heated to reflux at 140° C. Thirty-four minutes thereafter, a batch initiator mixture of 1.9 g of tert-butyl peroxyacetate (Luperox® 7M75 initiator from Atofina, Philadelphia, Pa.) from means 42 and 12.0 g of xylene supplied by ExxonMobil, Houston, Tex. from means 44 were added all at once to reactor 32. Directly thereafter, another batch initiator mixture of 17.5 g of tert-butyl peroxyacetate (Luperox® 7M75 initiator from Atofina, Philadelphia, Pa.) from means 42 and 108.4 g of xylene supplied by ExxonMobil, Houston, Tex. from means 44 were fed to reactor 32 over 220 minutes. Once the initiator feed was complete, still another batch initiator mixture of 19.4 g of Luperox® 7M75 initiator from means 42 and 139.1 g of xylene supplied by ExxonMobil, Houston, Tex. from means 44 were fed over half an hour to reactor 32. The amount of the initiator solution used was 1.5 weight percent based on the total weight of the monomer mixture. The reactor 32 was held at reflux for 1 hour and cooled to 80° C. An additional charge of 84.6 g of xylene supplied by ExxonMobil, Houston, Tex. from means 44 was added to reactor 32 and the batch filled out.

The resulting copolymer @ 65.3 weight percent solids had a GPC Mn of 2099 and GPC Mw of 2991 using a polystyrene standard. The Tg of the copolymer was −16.5° C., using dynamic scanning calorimetry.

Copolymer 4

To 1-liter hybrid reactor 10 fitted with heating jacket 16, stirrer 20, feed lines from means 22 for conveying hybrid reactor monomers, means 24 for conveying hybrid reactor initiator, and means 26 for conveying polymerization medium, an initial polymerization medium charge of 268.4 g of xylene supplied by ExxonMobil, Houston, Tex. was added from means 26. The polymerization medium was heated to 190° C. under sub-reflux at 54.7 psia (0.38 MPa) in reactor 10. A hybrid monomer mixture of 1244.9 g of isobornyl methacrylate (AGEFLEX® IBOMA from CIBA Specialty Chemicals, High Point, N.C.), 1244.9 g of isobutyl methacrylate (IBMA from Lucite International, Inc., Cordova, Tenn.), 1067.1 g of hydroxy ethyl acrylate (Rocryl® 420 HEA from Rohm and Haas, Philadelphia, Pa.) and 33.3 g of xylene supplied by ExxonMobil, Houston, Tex. as solvent was added to reactor 10 over a period of 240 minutes in such a way that the level in the reactor 10 was held constant at 0.55 liters and an excess portion of the hybrid reactor contents was fed to an attached 12-liter batch reactor 32 fitted with heating jacket 36, stirrer 38, water cooled condenser with nitrogen purge 46 and a feed line from means 44 for conveying batch reactor initiator. Simultaneously, a hybrid initiator mixture of 14.5 g of tert-butyl peroxyacetate (Luperox® 7M75 initiator from Atofina, Philadelphia, Pa.) from means 24 and 803.4 g of xylene supplied by ExxonMobil, Houston, Tex. from means 26 was added over a period of 240 minutes to reactor 10 under sub-reflux at 54.7 psia (0.38 MPa) in reactor 10. Polymerization temperature of 190° C. was maintained in reactor 10 over the entire reaction time. After completion of the feeds to reactor 10, it was drained over 25 minutes into reactor 32. Once transfer from reactor 10 to reactor 32 began, reactor 32 was heated to reflux at 140° C. Thirty-four minutes thereafter, a batch initiator mixture of 1.9 g of tert-butyl peroxyacetate (Luperox® 7M75 initiator from Atofina, Philadelphia, Pa.) from means 42 and 12.0 g of xylene supplied by ExxonMobil, Houston, Tex. from means 44 were added all at once to reactor 32. Directly thereafter, another batch initiator mixture of 17.5 g of tert-butyl peroxyacetate (Luperox® 7M75 initiator from Atofina, Philadelphia, Pa.) from means 42 and 108.4 g of xylene supplied by ExxonMobil, Houston, Tex. from means 44 were fed to reactor 32 over 220 minutes. Once the initiator feed was complete, still another batch initiator mixture of 19.4 g of Luperox® 7M75 initiator from means 42 and 139.1 g of xylene supplied by ExxonMobil, Houston, Tex. from means 44 were fed over half an hour to reactor 32. The amount of the initiator solution used was 1.5 weight percent based on the total weight of the monomer mixture. The reactor 32 was held at reflux for 1 hour and cooled to 80° C. An additional charge of 84.6 g of xylene supplied by ExxonMobil, Houston, Tex. from means 44 was added to reactor 32 and the batch filled out.

The resulting copolymer @ 65.3 weight percent solids had a GPC Mn of 1986 and GPC Mw of 2735 using a polystyrene standard. The Tg of the copolymer was 5.0° C., using dynamic scanning calorimetry.

Copolymer 5

To 1-liter hybrid reactor 10 fitted with heating jacket 16, stirrer 20, feed lines from means 22 for conveying hybrid reactor monomers, means 24 for conveying hybrid reactor initiator, and means 26 for conveying polymerization medium, an initial polymerization medium charge of 268.4 g of xylene supplied by ExxonMobil, Houston, Tex. was added from means 26. The polymerization medium was heated to 175° C. under sub-reflux at 54.7 psia (0.38 MPa) in reactor 10. A hybrid monomer mixture of 2489.8 g of isobornyl methacrylate (AGEFLEX® IBOMA from CIBA Specialty Chemicals, High Point, N.C.), 1067.1 g of hydroxy ethyl acrylate (Rocryl® 420 HEA from Rohm and Haas, Philadelphia, Pa.) and 33.3 g of xylene supplied by ExxonMobil, Houston, Tex. as solvent was added to reactor 10 over a period of 240 minutes in such a way that the level in the reactor 10 was held constant at 0.55 liters and an excess portion of the hybrid reactor contents was fed to an attached 12-liter batch reactor 32 fitted with heating jacket 36, stirrer 38, water cooled condenser with nitrogen purge 46 and a feed line from means 44 for conveying batch reactor initiator. Simultaneously, a hybrid initiator mixture of 14.5 g of tert-butyl peroxyacetate (Luperox® 7M75 initiator from Atofina, Philadelphia, Pa.) from means 24 and 803.4 g of xylene supplied by ExxonMobil, Houston, Tex. from means 26 was added over a period of 240 minutes to reactor 10 under sub-reflux at 54.7 psia (0.38 MPa) in reactor 10. Polymerization temperature of 190° C. was maintained in reactor 10 over the entire reaction time. After completion of the feeds to reactor 10, it was drained over 25 minutes into reactor 32. Once transfer from reactor 10 to reactor 32 began, reactor 32 was heated to reflux at 140° C. Thirty-four minutes thereafter, a batch initiator mixture of 1.9 g of tert-butyl peroxyacetate (Luperox® 7M75 initiator from Atofina, Philadelphia, Pa.) from means 42 and 12.0 g of xylene supplied by ExxonMobil, Houston, Tex. from means 44 were added all at once to reactor 32. Directly thereafter, another batch initiator mixture of 17.5 g of tert-butyl peroxyacetate (Luperox® 7M75 initiator from Atofina, Philadelphia, Pa.) from means 42 and 108.4 g of xylene supplied by ExxonMobil, Houston, Tex. from means 44 were fed to reactor 32 over 220 minutes. Once the initiator feed was complete, still another batch initiator mixture of 19.4 g of Luperox® 7M75 initiator from means 42 and 139.1 g of xylene supplied by ExxonMobil, Houston, Tex. from means 44 were fed over half an hour to reactor 32. The amount of the initiator solution used was 1.5 weight percent based on the total weight of the monomer mixture. The reactor 32 was held at reflux for 1 hour and cooled to 80° C. An additional charge of 84.6 g of xylene supplied by ExxonMobil, Houston, Tex. from means 44 was added to reactor 32 and the batch filled out.

The resulting copolymer @ 65.6 weight percent solids had a GPC Mn of 1935 and GPC Mw of 2656 using a polystyrene standard. The Tg of the copolymer was 38.6° C., using dynamic scanning calorimetry.

Copolymer 6

To 1-liter hybrid reactor 10 fitted with heating jacket 16, stirrer 20, feed lines from means 22 for conveying hybrid reactor monomers, means 24 for conveying hybrid reactor initiator, and means 26 for conveying polymerization medium, an initial polymerization medium charge of 268.4 g of xylene supplied by ExxonMobil, Houston, Tex. was added from means 26. The polymerization medium was heated to 175° C. under sub-reflux at 54.7 psia (0.38 MPa) in reactor 10. A hybrid monomer mixture of 2489.8 g of methyl methacrylate (MMA from Lucite International, Inc., Cordova, Tenn.), 1067.1 g of hydroxy ethyl acrylate (Rocryl® 420 HEA from Rohm and Haas, Philadelphia, Pa.) and 33.3 g of xylene supplied by ExxonMobil, Houston, Tex. as solvent was added to reactor 10 over a period of 240 minutes in such a way that the level in the reactor 10 was held constant at 0.55 liters and an excess portion of the hybrid reactor contents was fed to an attached 12-liter batch reactor 32 fitted with heating jacket 36, stirrer 38, water cooled condenser with nitrogen purge 46 and a feed line from means 44 for conveying batch reactor initiator. Simultaneously, a hybrid initiator mixture of 14.5 g of tert-butyl peroxyacetate (Luperox® 7M75 initiator from Atofina, Philadelphia, Pa.) from means 24 and 803.4 g of xylene supplied by ExxonMobil, Houston, Tex. from means 26 was added over a period of 240 minutes to reactor 10 under sub-reflux at 54.7 psia (0.38 MPa) in reactor 10. Polymerization temperature of 175° C. was maintained in reactor 10 over the entire reaction time. After completion of the feeds to reactor 10, it was drained over 25 minutes into reactor 32. Once transfer from reactor 10 to reactor 32 began, reactor 32 was heated to reflux at 140° C. Thirty-four minutes thereafter, a batch initiator mixture of 1.9 g of tert-butyl peroxyacetate (Luperox® 7M75 initiator from Atofina, Philadelphia, Pa.) from means 42 and 12.0 g of xylene supplied by ExxonMobil, Houston, Tex. from means 44 were added all at once to reactor 32. Directly thereafter, another batch initiator mixture of 17.5 g of tert-butyl peroxyacetate (Luperox® 7M75 initiator from Atofina, Philadelphia, Pa.) from means 42 and 108.4 g of xylene supplied by ExxonMobil, Houston, Tex. from means 44 were fed to reactor 32 over 220 minutes. Once the initiator feed was complete, still another batch initiator mixture of 19.4 g of Luperox® 7M75 initiator from means 42 and 139.1 g of xylene supplied by ExxonMobil, Houston, Tex. from means 44 were fed over half an hour to reactor 32. The amount of the initiator solution used was 1.5 weight percent based on the total weight of the monomer mixture. The reactor 32 was held at reflux for 1 hour and cooled to 80° C. An additional charge of 84.6 g of xylene supplied by ExxonMobil, Houston, Tex. from means 44 was added to reactor 32 and the batch filled out.

The resulting copolymer @ 65.7 weight percent solids had a GPC Mn of 2683 and GPC Mw of 4198 using a polystyrene standard. The Tg of the copolymer was 27.1° C., using dynamic scanning calorimetry.

Copolymer 7

To 1-liter hybrid reactor 10 fitted with heating jacket 16, stirrer 20, feed lines from means 22 for conveying hybrid reactor monomers, means 24 for conveying hybrid reactor initiator, and means 26 for conveying polymerization medium, an initial polymerization medium charge of 268.4 g of xylene supplied by ExxonMobil, Houston, Tex. was added from means 26. The polymerization medium was heated to 175° C. under sub-reflux at 65.5 psia (0.45 MPa) in reactor 10. A hybrid monomer mixture of 2489.8 g of methyl methacrylate (MMA from Lucite International, Inc., Cordova, Tenn.) 1067.1 g of hydroxy ethyl acrylate (Rocryle® 420 HEA from Rohm and Haas, Philadelphia, Pa.) and 33.3 g of xylene supplied by ExxonMobil, Houston, Tex. as solvent was added to reactor 10 over a period of 240 minutes in such a way that the level in the reactor 10 was held constant at 0.55 liters and an excess portion of the hybrid reactor contents was fed to an attached 12-liter batch reactor 32 fitted with heating jacket 36, stirrer 38, water cooled condenser with nitrogen purge 46 and a feed line from means 44 for conveying batch reactor initiator. Simultaneously, a hybrid initiator mixture of 14.5 g of tert-butyl peroxyacetate (Luperox® 7M75 initiator from Atofina, Philadelphia, Pa.) from means 24 and 803.4 g of xylene supplied by ExxonMobil, Houston, Tex. from means 26 was added over a period of 240 minutes to reactor 10 under sub-reflux at 54.7 psia (0.38 MPa) in reactor 10. Polymerization temperature of 175° C. was maintained in reactor 10 over the entire reaction time. After completion of the feeds to reactor 10, it was drained over 25 minutes into reactor 32. Once transfer from reactor 10 to reactor 32 began, reactor 32 was heated to reflux at 140° C. Thirty-four minutes thereafter, a batch initiator mixture of 1.9 g of tert-butyl peroxyacetate (Luperox® 7M75 initiator from Atofina, Philadelphia, Pa.) from means 42 and 12.0 g of xylene supplied by ExxonMobil, Houston, Tex. from means 44 were added all at once to reactor 32. Directly thereafter, another batch initiator mixture of 17.5 g of tert-butyl peroxyacetate (Luperox® 7M75 initiator from Atofina, Philadelphia, Pa.) from means 42 and 108.4 g of xylene supplied by ExxonMobil, Houston, Tex. from means 44 were fed to reactor 32 over 220 minutes. Once the initiator feed was complete, still another batch initiator mixture of 19.4 g of Luperox® 7M75 initiator from means 42 and 139.1 g of xylene supplied by ExxonMobil, Houston, Tex. from means 44 were fed over half an hour to reactor 32. The amount of the initiator solution used was 1.5 weight percent based on the total weight of the monomer mixture. The reactor 32 was held at reflux for 1 hour and cooled to 80° C. An additional charge of 84.6 g of xylene supplied by ExxonMobil, Houston, Tex. from means 44 was added to reactor 32 and the batch filled out. The resulting copolymer @ 64.7 weight percent solids had a GPC Mn of 2683 and GPC Mw of 3386 using a polystyrene standard. The Tg of the copolymer was 27.1° C., using dynamic scanning calorimetry.

Macromonomer 1

To a 1-liter hybrid reactor 10 fitted with heating jacket 16, stirrer 20, feed lines from means 22 for conveying hybrid reactor monomers, means 24 for conveying hybrid reactor initiator, and means 26 for conveying polymerization medium, an initial polymerization medium charge of 355.0 g of ethyl acetate and 61.7 g of 10% solution of bis(boron difluoro diphenyl glyoximato) cobaltate (II) in ethyl acetate is added from means 26. The polymerization medium is heated to 170° C. under sub-reflux pressure of 184.2 psia (1.27 MPa) in reactor 10. A hybrid monomer mixture of 924.6 g 2-ethyl-hexyl methacrylate (Monomer H22 from Lucite International, Inc. Cordova, Tenn.), 462.3 g of iso-bornyl methacrylate (AGEFLEX® IBOMA from CIBA Specialty Chemicals, High Point, N.C.), 1387.4 g of n-butyl methacrylate (N-212 from Lucite International, Inc. Cordova, Tenn.), 308.2 g of t-butylaminoethyl methacrylate (AGEFLEX® FM-4, from CIBA Specialty Chemicals, High Point, N.C.) and 88.2 g of ethyl acetate as solvent is added to reactor 10 over a period of 240 minutes in such a way that the level in the reactor 10 is held constant at 0.55 liters and an excess portion of the hybrid reactor contents is fed to an attached 12-liter batch reactor 32 fitted with heating jacket 36, stirrer 38, water cooled condenser with nitrogen purge 46 and a feed line from means 44 for conveying batch reactor initiator. Simultaneously, a hybrid initiator mixture of 27.7 g of 2,2'-azobis(2-methylbutanenitrile) (Vazo® 67 from DuPont, Bell, W. Va.) from means 24 and 1063.4 g of ethyl acetate from means 26 is added over a period of 240 minutes to reactor 10 under sub-reflux at 184.2 psia (1.27 Mpa). Polymerization temperature of 175° C. is maintained in reactor 10 over the entire reaction time. After completion of the feeds to reactor 10, it is drained over 25 minutes into reactor 32. Once transfer from reactor 10 to reactor 32 began, reactor 32 is heated to reflux at 77° C. Thirty-three minutes thereafter, a batch initiator mixture of 0.9 g of 2,2'-azobis(2-methylbutanenitrile) (Vazo® 67 from DuPont, Bell, W. Va.) from means 42 and 18.2 g of ethyl acetate from means 44 is added all at once to reactor 32. Directly thereafter, another batch initiator mixture of 8.3 g of 2,2'-azobis(2-methyl-butanenitrile) (Vazo® 67 from DuPont, Bell, W. Va.) from means 42 and 171.2 g of ethyl acetate from means 44 is fed to reactor 32 over 230 minutes. Once the initiator feed is complete, still another batch initiator mixture of 12.3 g of 2,2'-azobis(2-methylbutanenitrile) (Vazo® 67 from DuPont, Bell, W. Va.) from means 42 and 213.9 g of ethyl acetate from means 44 is fed over half an hour to reactor 32. The amount of the initiator solution used is 1.6 weight percent based on the total weight of the monomer mixture. The reactor 32 is held at reflux for 1 hour and cooled to 80° C. An additional charge of 85.4 g of ethyl acetate from means 44 is added to reactor 32 and the batch is filled out. The resulting macromonomer is @ 60.1% solids.

Graft Copolymer

To a 1-liter hybrid reactor 10 fitted with heating jacket 16, stirrer 20, feed lines from means 22 for conveying hybrid reactor monomers, means 24 for conveying hybrid reactor initiator, and means 26 for conveying polymerization medium, an initial polymerization medium charge of 388.0 g of ethyl acetate and 61.7 g of 10% solution of bis(boron difluoro diphenyl glyoximato) cobaltate (II) in ethyl acetate is added from means 26. The polymerization medium is heated to 170° C. under sub-reflux pressure of 184.2 psia (1.27 MPa) in reactor 10. A hybrid monomer mixture of 593.0 g 2-ethyl-hexyl methacrylate (Monomer H22 from Lucite International, Inc. Cordova, Tenn.), 296.5 g of iso-bornyl methacrylate (AGEFLEX® IBOMA from CIBA Specialty Chemicals, High Point, N.C.), 889.8 g of n-butyl methacrylate (N-212 from Lucite International, Inc. Cordova, Tenn.), 197.7 g, of t-butylaminoethyl methacrylate (AGEFLEX® FM-4, from CIBA Specialty Chemicals, High Point, N.C.) and 388.0 g of ethyl acetate as solvent is added to reactor 10 over a period of 240 minutes in such a way that the level in the reactor 10 is held constant at 0.55 liters and an excess portion of the hybrid reactor contents is fed to an attached 12-liter batch reactor 32 fitted with heating jacket 36, stirrer 38, water cooled condenser with nitrogen purge 46 and a feed line from means 44 for conveying batch reactor initiator. Simultaneously, a hybrid initiator mixture of 26.0 g of 2,2'-azobis(2-methylbutanenitrile) (Vazo® 67 from DuPont, Bell, W. Va.) from means 24 and 1292.0 g of ethyl acetate from means 26 is added over a period of 240 minutes to reactor 10 under sub-reflux at 184.2 psia (1.27 Mpa). Polymerization temperature of 175° C. is maintained in reactor 10 over the entire reaction time. After completion of the feeds to reactor 10, it is drained over 25 minutes into reactor 32. Once transfer from reactor 10 to reactor 32 began, reactor 32 is heated to reflux at 77° C. Thirty-five minutes thereafter, a batch initiator mixture of 1.3 g of tert-butyl peroxypivalate (Luperox® 11 M75 initiator from Atofina, Philadelphia, Pa.) from means 42 and 41.4 g of ethyl acetate from means 44 is added all at once to reactor 32. Directly thereafter, another batch initiator mixture of 11.7 g of tert-butyl peroxypivalate (Luperox® 11M75 initiator from Atofina, Philadelphia, Pa.) from means 42 and 372.2 g of ethyl acetate from means 44 is fed to reactor 32 over 235 minutes. Simultaneously, 659.0 g of n-butyl acrylate (n-butyl acrylate from Rohm and Haas, Philadelphia, Pa.) from means 40 is fed to reactor 32 over 235 minutes. Once the initiator and monomer feeds are complete, still another batch initiator mixture of 12.3 g of tert-butyl peroxypivalate (Luperox® 11 M75 initiator from Atofina, Philadelphia, Pa.) from means 42 and 103.4 g of ethyl acetate from means 44 is fed over half an hour to reactor 32. The amount of the initiator solution used is 2.0 weight percent based on the total weight of the monomer mixture. The reactor 32 is held at reflux for 1 hour and cooled to 80° C. The resulting graft copolymer is @ 50.0% solids.

What is claimed is:

1. A process for producing a polymer comprising:
   conveying hybrid reactor mixtures comprising one or more hybrid reactor monomers and one or more hybrid reactor initiators to one or more hybrid reactors maintained at effective hybrid polymerization temperatures and sub-reflux polymerization gage pressures to cause polymerization of a portion of said hybrid reactor monomers into said polymer; and
   conveying hybrid reactor contents to one or more batch reactors maintained at effective batch polymerization temperatures and reflux polymerization gage pressures to cause polymerization of a remaining portion of said hybrid reactor monomers into said polymer.

2. The process of claim 1 wherein said hybrid reactor mixture comprises a polymerization medium.

3. The process of claim 2 wherein said polymerization medium comprises one or more organic solvents, an aqueous medium, or a polymeric component.

4. The process of claim 3 wherein said organic solvent is selected from the group consisting of acetone, methyl amyl ketone, methyl ethyl ketone, an aromatic solvent blend, xylene, toluene, ethyl acetate, n-butyl acetate, t-butyl acetate, butanol, glycol ether, and combination thereof.

5. The process of claim 3 wherein said aqueous medium comprises water, or an aqueous solution of water and a water miscible solvent.

6. The process of claim 3 wherein said polymeric component comprises a polyester, acrylic polymer, or a mixture thereof solvated or dispersed in one or more said organic solvents or said aqueous medium.

7. The process of claim 1 further comprising conveying a polymerization medium to said hybrid reactors before said hybrid reactor mixtures are conveyed to said hybrid reactors.

8. The process of claim 1 wherein an excess portion of said hybrid reactor contents is conveyed to said batch reactors once said hybrid reactors are filled to preset levels.

9. The process of claim 1 wherein said hybrid reactors are stirred tank reactors.

10. The process of claim 1 wherein said hybrid polymerization temperatures range from 80° C. to 400° C.

11. The process of claim 1 wherein said sub-reflux polymerization gage pressures in said hybrid reactors range from 0 to 2.76 MPa (0 to 400 psig).

12. The process of claim 1 wherein said portion of said monomers polymerized in said hybrid reactors ranges from 30 weight percent to 99 weight percent, all based on the total amount of monomers conveyed to said hybrid reactors.

13. The process of claim 1 comprising conveying inert gas in vapor space in said hybrid reactors.

14. The process of claim 13 wherein said inert gas is nitrogen, argon, carbon dioxide or a mixture thereof.

15. The process of claim 1 wherein batch reactor contents comprise a polymerization medium.

16. The process of claim 15 wherein said polymerization medium comprises one or more organic solvents, or an aqueous medium.

17. The process of claim 1 further comprising conveying one or more said initiators to said batch reactors.

18. The process of claim 1 or 17 further comprising conveying one or more said monomers to said batch reactors.

19. The process of claim 1 further comprising conveying a polymerization medium to said batch reactors before said hybrid reactor contents are conveyed to said batch reactors.

20. The process of claim 1 wherein said batch reactors are stirred tank reactors.

21. The process of claim 1 wherein said batch polymerization temperatures range from 80° C. to 300° C.

22. The process of claim 1 wherein said reflux polymerization pressures in said batch reactors are at an atmospheric pressure.

23. The process of claim 1 comprising conveying inert gas in vapor space in said batch reactors.

24. The process of claim 1 wherein a solution of said hybrid reactor initiators in a polymerization medium is conveyed to said hybrid reactors.

25. The process of claim 1 wherein said hybrid reactor monomers are selected from the group consisting of (meth) acrylate monomers, functional (meth)acrylic monomers, acid monomers, nitrile monomers, styrene, styrenic monomers, amide monomers, silyl monomers, vinyl monomers, and a combination thereof.

26. The process of claim 1 wherein said initiators comprise redox initiators, thermal initiators, photochemical initiators, or a combination thereof.

27. The process of claim 1 further comprising conveying a portion or all of said hybrid reactors contents to said batch reactors when preset unsafe hybrid reactor pressures are reached.

28. The process of claim 2 further comprising rinsing said hybrid reactors with a chaser portion of the polymerization medium after all of the hybrid reactor contents had been conveyed to batch reactors; and
conveying said chaser portion to said batch reactors.

29. The process of claim 1 wherein said polymer is an acrylic polymer, a blend of an acrylic polymer and polyester, microgel, homopolymer, copolymer, block copolymer, graft copolymer, comb copolymer, branched copolymer, branch-upon-branch copolymer, non-aqueous polymer dispersion, star polymer, oligomer, and a ladder copolymer.

30. A process for producing a polymer comprising:
conveying a hybrid reactor mixture comprising one or more hybrid reactor monomers and one or more hybrid reactor initiators to a hybrid reactor maintained at an effective hybrid polymerization temperature and sub-reflux polymerization gage pressure to cause polymerization of substantial amount of said hybrid reactor monomers into said polymer; and
conveying hybrid reactor contents to a batch reactor maintained at an effective batch polymerization temperature and reflux polymerization gage pressure to cause polymerization of remaining amount of said hybrid reactor monomers into said polymer.

31. A process for producing a graft copolymer comprising:
conveying hybrid reactor mixtures comprising one or more hybrid reactor monomers and one or more hybrid reactor initiators to one or more hybrid reactors maintained at effective hybrid polymerization temperatures and sub-reflux polymerization gage pressures to cause polymerization of said hybrid monomers into macromonomers;
conveying hybrid reactor contents to one or more batch reactors maintained at effective batch polymerization temperatures and reflux polymerization gage pressures; and
conveying batch reactor mixtures comprising one or more batch reactor monomers and one or more batch reactor initiators to cause polymerization of said batch reactor monomers into a backbone of said graft copolymer having said macromonomers grafted onto said backbones.

32. The process of claim 31 comprising conveying on or more chain transfer catalysts to provide said macromonomers with an unsaturated terminal group.

33. The process of claim 32 wherein said chain transfer catalyst is diaquabis(borondifluorodimethylglyoximato)cobaltate (II), diaquabis(borondifluorodiphenylglyoximato)cobaltate (II), pentacyanocobaltate (II), or a combination thereof.

34. The process of claim 31 wherein said hybrid reactor contents and said batch reactor mixtures are conveyed simultaneously to said batch reactors or said hybrid reactor contents are conveyed to said batch reactors after said conveying of a portion or all of said batch reactor monomers to said batch reactors.

35. The process of claim 34 wherein a portion or all of said batch reactor initiators is conveyed simultaneously with said batch reactor monomers or with said hybrid reactor contents to said batch reactors.

36. The process of claim 34 further comprising conveying a polymerization medium to said hybrid reactors, said batch reactors; or to said hybrid and batch reactors before conveying said hybrid reaction mixtures to said hybrid reactors.

37. The process of claim 34 further comprising conveying a polymerization medium to said hybrid reactors before conveying said hybrid reaction mixtures to said hybrid reactors.

38. The process of claim 34 further comprising conveying a polymerization medium to said batch reactors before conveying said hybrid reactor contents to said batch reactors.

39. The process of claim 34 further comprising conveying a polymerization medium to said batch reactors before conveying said batch reactor mixtures to-said batch reactors.

40. The process of claim 34 further comprising conveying a polymerization medium to said batch reactors before conveying said batch reactor mixtures and said hybrid reactors contents to said batch reactors.

41. The process claim 34, 35, 36, 37, 38, 39 or 40 wherein a solution of said hybrid reactor initiators in a portion of said polymerization medium is conveyed to said hybrid reactors.

42. The process claim 34, 35, 36, 37, 38, 39 or 40 wherein a solution of said batch reactor initiators in a portion of said polymerization medium is conveyed to said batch reactors.

43. The process claim 34, 35, 36, 37, 38, 39 or 40 wherein a solution of said hybrid reactor initiators in a portion of said polymerization medium is conveyed to said hybrid reactors; and a solution of said batch reactor initiators in another portion of said polymerization medium is conveyed to said batch reactors.

44. A process for producing a polymer blend comprising:
conveying hybrid reactor mixtures comprising one or more hybrid reactor monomers and one or more hybrid reactor initiators to one or more hybrid reactors maintained at effective hybrid polymerization temperatures and subreflux polymerization gage pressures to cause polymerization of said hybrid monomers into a hybrid reactor polymer;

conveying hybrid reactor contents to one or more batch reactors maintained at effective batch polymerization temperatures and reflux pressures; and conveying batch reactor mixtures comprising one or more batch reactor monomers and one or more batch reactor initiators to cause polymerization of said batch reactor monomers into a reactor polymer to form said polymer blend.

* * * * *